US010367924B2

(12) United States Patent
Belikovetsky et al.

(10) Patent No.: US 10,367,924 B2
(45) Date of Patent: Jul. 30, 2019

(54) POSITION-BASED COMMUNICATION ROUTING

(71) Applicant: Interwise Ltd., Airport City (IL)

(72) Inventors: Sofia Belikovetsky, Petah Tikva (IL);
Yossi Ben-Hagai, Petah Tikva (IL);
Ofer HaCohen, Ramat HaSharon (IL)

(73) Assignee: Interwise Ltd., Airport City (IL)

( * ) Notice: Subject to any disclaimer, the term of this patent is extended or adjusted under 35 U.S.C. 154(b) by 139 days.

(21) Appl. No.: 15/245,786

(22) Filed: Aug. 24, 2016

(65) Prior Publication Data
US 2018/0063295 A1    Mar. 1, 2018

(51) Int. Cl.
*H04L 29/06* (2006.01)
*H04L 12/761* (2013.01)
*H04L 12/721* (2013.01)
*H04L 12/18* (2006.01)
*H04L 29/08* (2006.01)

(52) U.S. Cl.
CPC .......... *H04L 69/22* (2013.01); *H04L 12/1845* (2013.01); *H04L 45/16* (2013.01); *H04L 45/34* (2013.01); *H04L 67/12* (2013.01); *H04L 67/18* (2013.01)

(58) Field of Classification Search
CPC ..... H04L 12/1845; H04L 69/22; H04L 45/16; H04L 45/34
See application file for complete search history.

(56) References Cited

U.S. PATENT DOCUMENTS

| 7,558,674 | B1* | 7/2009 | Neilley | G01W 1/02 |
| | | | | 702/3 |
| 8,984,113 | B2 | 3/2015 | Li et al. | |
| 9,609,128 | B2* | 3/2017 | Dahan | H04W 4/90 |
| 9,860,167 | B2* | 1/2018 | Oliver | H04L 45/74 |
| | | | | 370/339 |
| 2004/0192189 | A1* | 9/2004 | Yuhara | H04B 7/18523 |
| | | | | 455/3.02 |
| 2005/0030977 | A1* | 2/2005 | Casey | G08B 27/00 |
| | | | | 370/485 |
| 2009/0181639 | A1* | 7/2009 | Glanton | H04W 4/90 |
| | | | | 455/404.1 |

(Continued)

FOREIGN PATENT DOCUMENTS

WO    WO 2016/070106    5/2016

OTHER PUBLICATIONS

Dobson et al.; "Network-level Synchronization in Decentralized Social Ad-Hoc Networks"; IEEE 5$^{th}$ Int'l Conf. Pervasive Computing and Application (ICPCA); 2010; 7 pages.

(Continued)

*Primary Examiner* — Hashim S Bhatti
(74) *Attorney, Agent, or Firm* — BakerHostetler

(57) ABSTRACT

A method includes receiving, at a network control system, a message that includes content and a header. The header identifies a propagation mode for sending the content via a network. The method includes, based on at least the propagation mode, obtaining location data regarding a plurality of devices connected to the network. The method also includes, based on at least the location data, identifying an intended recipient from the plurality of devices. The method includes transmitting the content to the intended recipient.

18 Claims, 11 Drawing Sheets

(56) References Cited

U.S. PATENT DOCUMENTS

| | | | |
|---|---|---|---|
| 2010/0304759 A1* | 12/2010 | Leppanen | H04W 4/02 455/456.2 |
| 2012/0331088 A1* | 12/2012 | O'Hare | G06F 21/6227 709/214 |
| 2013/0170424 A1* | 7/2013 | Anchan | H04L 69/22 370/312 |
| 2014/0185499 A1* | 7/2014 | Ray | H04W 84/18 370/310 |
| 2014/0244834 A1 | 8/2014 | Guedalia et al. | |
| 2015/0019710 A1 | 1/2015 | Shaashua et al. | |
| 2015/0019714 A1 | 1/2015 | Shaashua et al. | |
| 2015/0074195 A1 | 3/2015 | Mani et al. | |
| 2015/0111519 A1* | 4/2015 | Li | H04W 4/06 455/404.1 |
| 2015/0131499 A1* | 5/2015 | Hall | H04L 45/74 370/310 |
| 2015/0181505 A1 | 6/2015 | Deng et al. | |
| 2015/0195137 A1* | 7/2015 | Kashyap | H04L 41/0893 370/254 |
| 2015/0381776 A1 | 12/2015 | Seed et al. | |
| 2016/0007316 A1* | 1/2016 | Vaidya | H04W 68/02 370/312 |
| 2016/0132977 A1* | 5/2016 | Fredericks | G06Q 50/14 455/456.3 |
| 2016/0135241 A1 | 5/2016 | Gujral et al. | |
| 2017/0230192 A1* | 8/2017 | Hall | H04L 45/74 |
| 2017/0269981 A1* | 9/2017 | Schellenberger | G06F 11/0769 |

OTHER PUBLICATIONS

Guo et al.; "PSync: Visible Light-Based Time Synchronization for Internet of Things (IoT)"; 9 pages.

* cited by examiner

POSITION-BASED COMMUNICATION ROUTING

TECHNICAL FIELD

The technical field relates generally to network communication routing and, more specifically, to systems and methods for allowing devices to conduct position-based communication with other devices without the need for such devices to track the location of themselves or the recipient devices.

BACKGROUND

It may be advantageous for devices to be able to communicate with recipient devices based on the absolute or relative location of those recipient devices. However, not all network-connected devices may have the functionality to track their own locations, let alone determine the locations of other network-connected devices. For example, routing communications between and synchronization of internet of things (IoT) devices may be problematic.

SUMMARY

The disclosed systems and methods may allow for devices to conduct communications, including location-based communications, with one another through a network, which may not require the device to know the identity of the device(s) to which they want to communicate or to have other functionality, such as GPS functionality, to identify such devices. For example, adding control features to the network layer without changing the logic of IoT devices themselves may solve the problem of routing and synchronization. In this manner IoT devices may be able to send messages to other devices without knowing in advance what or who those devices are. The routing may be based on location of the other devices.

The present disclosure is directed to a method. A method may include receiving, at a network control system, a message. The message may include content and a header. The header may identify a propagation mode for sending the content via a network. The method may also include, based on at least the propagation mode, obtaining location data regarding a plurality of devices connected to the network. The method may also include, based on at least the location data, identifying an intended recipient from the plurality of devices. The method may include transmitting the content to the intended recipient.

The present disclosure is also directed to a network controller. The network controller may include an input/output system for communicatively coupling the network controller to a network. The network controller may also include a processor communicatively coupled to the input/output system and memory storing instructions that may cause the processor to effectuate operations. The operations may include receiving, at the input/output system, a message. The message may include content and a header. The header may identify a propagation mode for sending the content via a network. The method may also include, based on at least the propagation mode, obtaining location data regarding a plurality of devices connected to the network. The method may also include, based on at least the location data, identifying an intended recipient from the plurality of devices. The method may include transmitting the content to the intended recipient.

The present disclosure is also directed to a method that may include receiving a message from a source device. The message may include destination information and content. The method may also include determining an area based on at least the destination information and identifying a destination device located within the area based on at least network data. The method may also include routing the content to the destination device.

BRIEF DESCRIPTION OF THE DRAWINGS

Aspects of the herein described telecommunications network and systems and methods for antenna switching based on device position are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers may refer to like elements throughout the application.

DETAILED DESCRIPTION

Figure 1:
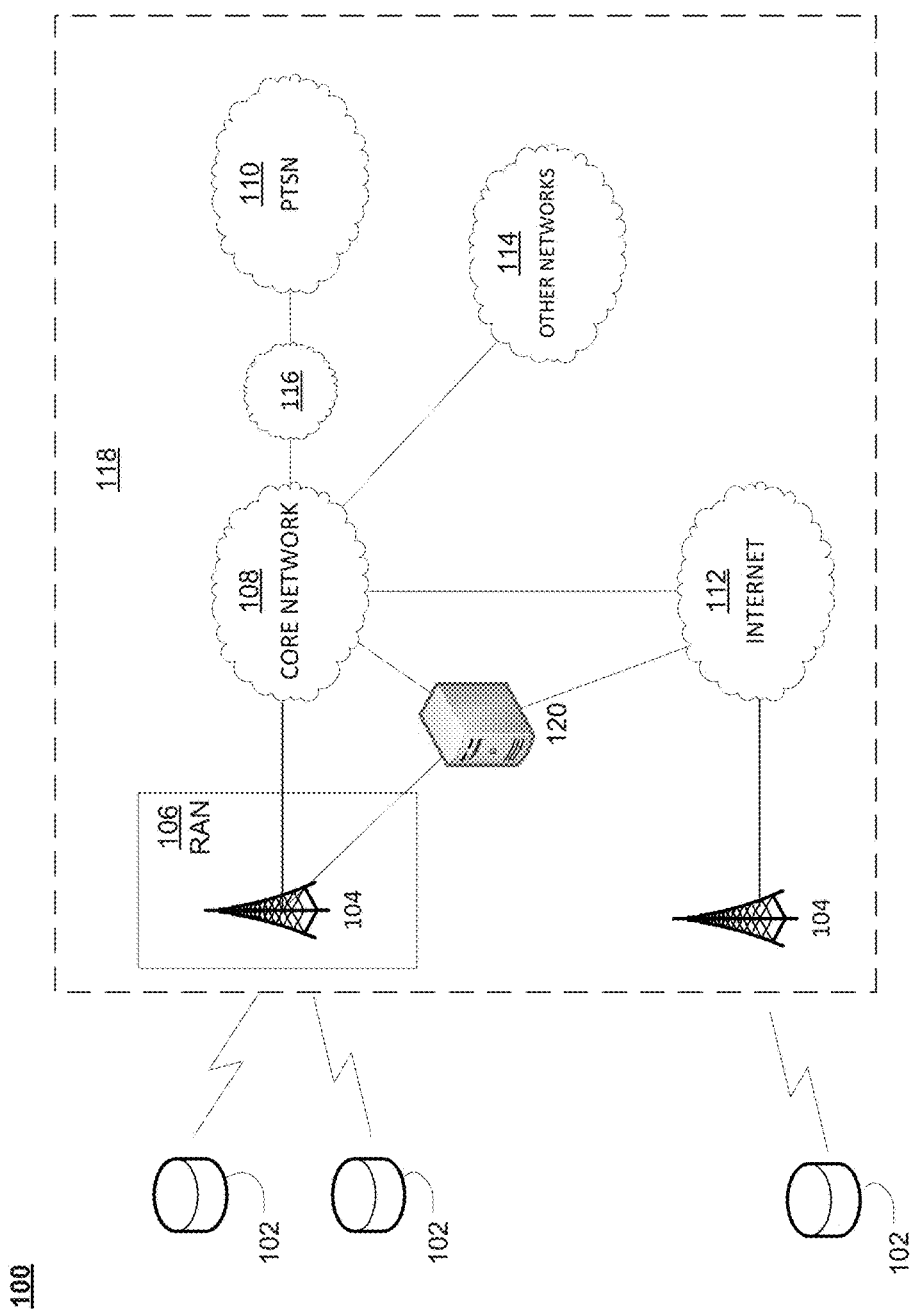
FIG. 1 illustrates an exemplary telecommunications system.

FIG. 1 illustrates a telecommunication system in which one or more devices 102, such as wireless transmit/receive units (WTRUs) or other network-connectable devices, may communicate via one or more access points, such as base stations 104, to one or more networks. For example, devices 102 may include one or more end user devices, such as personal computers, tablets, smart phones, or other mobile devices; physical devices, like lighting equipment, televisions, home appliances, or the like; sensors or sensor-equipped systems, including health monitors, biometric sensors, sensors that track statistics on objects, environments, or other things; vehicles, including manned and unmanned vehicles, whether or not autonomous, robotic devices, machinery, and the like. Devices 102 may include other network-connected devices, including servers and backend systems. Devices 102 may include IoT devices and devices that may communicate with IoT devices.

Telecommunication system 100 may include one or more networks, such as a radio access network (RAN) 106, a core network 108, a public switched telephone network (PSTN) 110, the Internet 112, or other networks 114 (generally, collectively, and individually "network 118"). Telecommunication system 100 may include an air interface over which one or more devices 102 may communicate. The disclosed examples contemplate any number of devices 102, base stations, networks, or network elements.

Each of base stations 104 may be any type of device configured to wirelessly interface with at least one device 102 to facilitate access to or communication with network 118. By way of example, base stations 104 may be a base transceiver station (BTS), a Node-B, an eNode B, a Home Node B, a Home eNode B, a site controller, an access point (AP), a wireless router, or the like. While base stations 104 are each depicted as a single element, it will be appreciated that base stations 104 may include any number of interconnected base stations or network elements.

RAN 106 may include one or more base stations 104, along with other network elements (not shown), such as a base station controller (BSC), a radio network controller (RNC), or relay nodes. One or more base stations 104 may be configured to transmit or receive wireless signals within a particular geographic region, which may be referred to as a cell (not shown). The cell may further be divided into cell sectors. For example, the cell associated with base station 104 may be divided into three sectors such that base station 104 may include three transceivers: one for each sector of the cell. In another example, base station 104 may employ multiple-input multiple-output (MIMO) technology and, therefore, may utilize multiple transceivers for each sector of the cell.

Base stations 104 may communicate with one or more of devices 102 over air interface 116, which may be any suitable wireless communication link (e.g., radio frequency (RF), microwave, infrared (IR), ultraviolet (UV), or visible light). Air interface 116 may be established using any suitable radio access technology (RAT).

More specifically, as noted above, telecommunication system 100 may be a multiple access system and may employ one or more channel access schemes, such as CDMA, TDMA, FDMA, OFDMA, SC-FDMA, or the like. For example, base station 104 in RAN 106 and devices 102 connected to RAN 106 may implement a radio technology such as Universal Mobile Telecommunications System (UMTS) Terrestrial Radio Access (UTRA) that may establish air interface 116 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example, base station 104 and devices 102 that are connected to RAN 106 may implement a radio technology such as Evolved UMTS Terrestrial Radio Access (E-UTRA), which may establish air interface 116 using LTE or LTE-Advanced (LTE-A).

Optionally base station 104 and devices 102 connected to RAN 106 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 104 may be a wireless router, Home Node B, Home eNode B, or access point, for example, and may utilize any suitable RAT for facilitating wireless connectivity in a localized area, such as a place of business, a home, a vehicle, a campus, or the like. For example, base station 104 and associated devices 102 may implement a radio technology such as IEEE 602.11 to establish a wireless local area network (WLAN). As another example, base station 104 and associated devices 102 may implement a radio technology such as IEEE 602.15 to establish a wireless personal area network (WPAN). In yet another example, base station 104 and associated devices 102 may utilize a cellular-based RAT (e.g., WCDMA, CDMA2000, GSM, LTE, LTE-A, etc.) to establish a picocell or femtocell. As shown in FIG. 1, base station 104 may have a direct connection to Internet 112. Thus, base station 104 may not be required to access Internet 112 via core network 108.

RAN 106 may be in communication with core network 108, which may be any type of network configured to provide voice, data, applications, or voice over internet protocol (VoIP) services to one or more devices 102. For example, core network 108 may provide call control, billing services, mobile location-based services, pre-paid calling, Internet connectivity, video distribution or high-level security functions, such as user authentication. Although not shown in FIG. 1, it will be appreciated that RAN 106 or core network 108 may be in direct or indirect communication with other RANs that employ the same RAT as RAN 106 or a different RAT. For example, in addition to being connected to RAN 106, which may be utilizing an E-UTRA radio technology, core network 108 may also be in communication with another RAN (not shown) employing a GSM radio technology.

Core network 108 may also serve as a gateway for devices 102 to access PSTN 110, Internet 112, or other networks 114. PSTN 110 may include circuit-switched telephone networks that provide plain old telephone service (POTS). For LTE core networks, core network 108 may use IMS core 614 to provide access to PSTN 110. Internet 112 may include a global system of interconnected computer networks or devices that use common communication protocols, such as TCP, user datagram protocol (UDP), or IP in the TCP/IP internet protocol suite. Other networks 114 may include wired or wireless communications networks owned or operated by other service providers. For example, other networks 114 may include another core network connected to one or more RANs, which may employ the same RAT as RAN 106 or a different RAT.

Some or all devices 102 in telecommunication system 100 may include multi-mode capabilities. That is, devices 102 may include multiple transceivers for communicating with different wireless networks over different wireless links. For example, one or more devices 102 may be configured to communicate with base station 104, which may employ a cellular-based radio technology, and with base station 104, which may employ an IEEE 802 radio technology.

Telecommunication system 100 may include one or more network controllers 120, which may include hardware or software for facilitating communication with or between devices 102. Network 118 may collect or have access to information about devices connected to network 118, such as devices 102, including, but not limited to, information that may indicate a location of a particular device 102. For example, as discussed in more detail below with respect to FIG. 9, network 118 may include a home location register, a home subscriber server, a mobile switching center server, a visitor location register, gateways, routers, and access points. These network components may have information that is indicative of the location one or more connected devices 102. For example, access points, such as base station 104 may have information regarding the identity of devices 102 connected to base station 104. Given the known location of base station 104, location data of devices 102 connected to base station 104 may be derived.

For example, devices 102 may desire to communicate with certain other devices 102, but may not have the identities of such devices 102. Network controller 120 may have access to certain information that may be used to determine the specific identity of devices to which data or a message is to be relayed. For example, network controller 120 may identify recipient devices 102 based on the locations of such devices 102, based on information from network 118, or based on the locations of devices 102 related to recipient device 102, or the like. For example, recipient devices 102 may include backend systems components that communicate with IoT devices located within a particular area. The location data may indicate a geographical location of devices 102.

Figure 2:
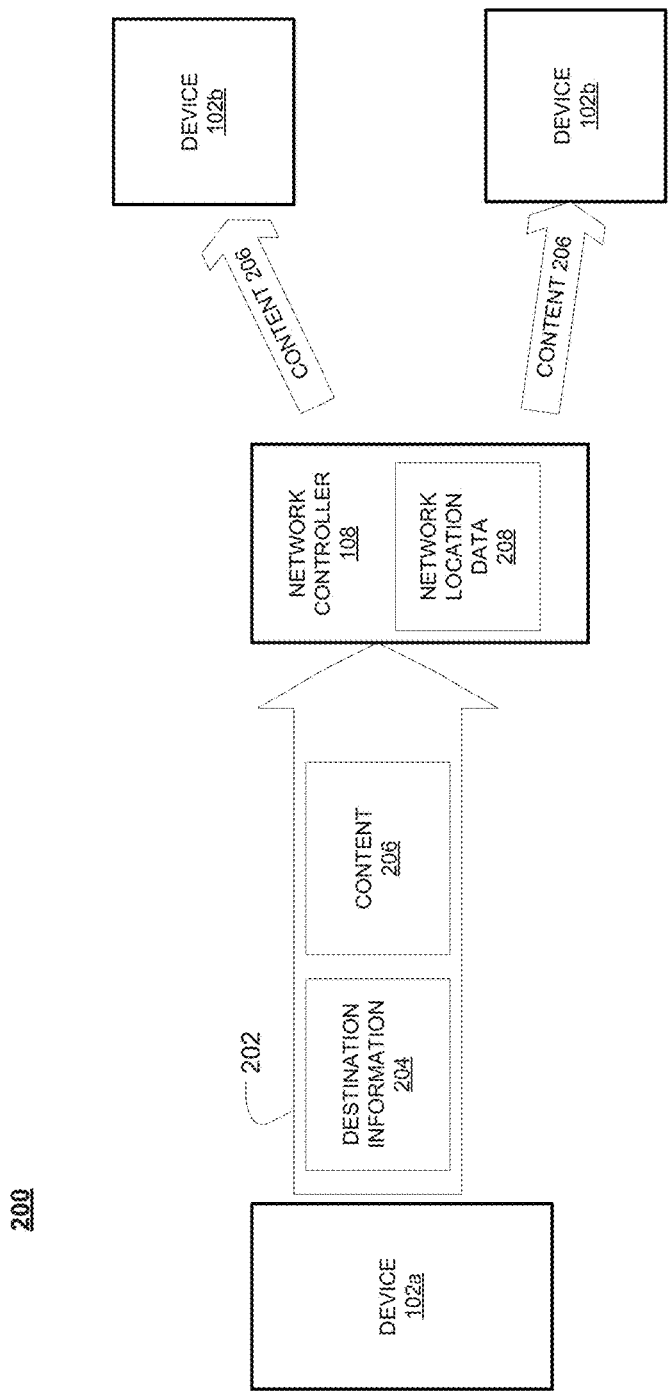
FIG. 2 illustrates an exemplary data flow in accordance with an aspect of this disclosure.

FIG. 2 is a diagram of data flow 200 that may be used within telecommunication system 100 for devices 102a to communicate with one another without knowing the identities of the recipient devices 102b. For example, recipient devices 102b may include devices 102 connected to network 118, a specific network (e.g., core network 108), devices 102 connected to a specific access point (e.g., base station 104), devices 102 within a specific area (e.g., a geographic area), such as within a certain proximity to the sending device 102, the closest devices 102 to sending device 102a, or the like. Desired recipient devices 102a may include devices of a certain type.

Message 202 may include destination information 204 that, together with location data 208, may be used by network controller to identify recipient devices 102b. Network controller 120 may relay the message from sender device 102a to recipient devices 102b identified by network controller 120.

Figure 3:
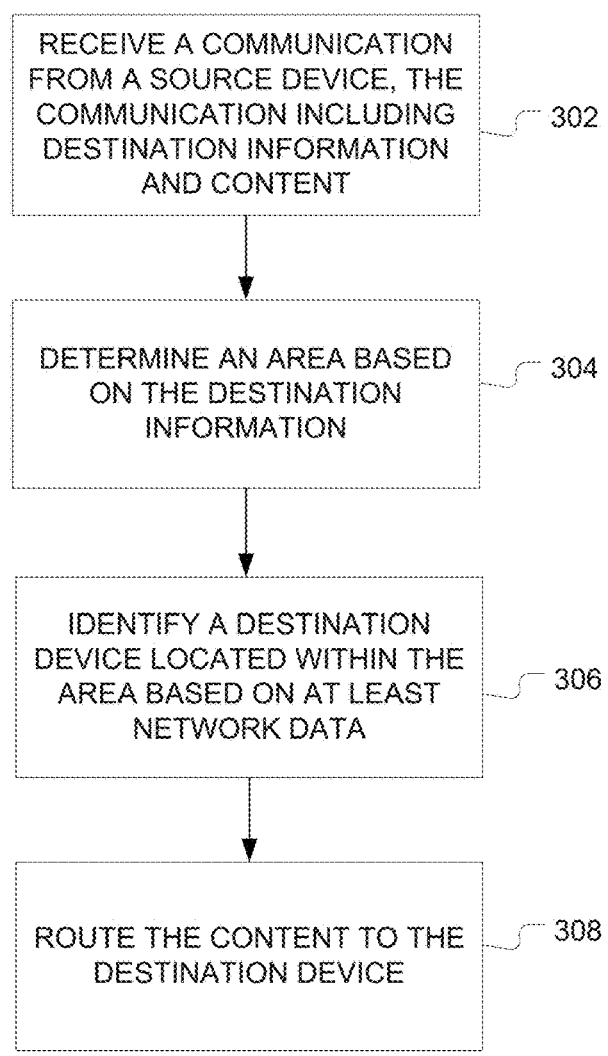
FIG. 3 is a flowchart of an exemplary method for location-based communications.

Reference is now made to FIG. 3, an exemplary flow chart of a method 300, which may be used to accomplish data flow 200. For example, step 302 may include receiving message 202 directly or indirectly from source device 102a. In an aspect, message 202 may include a transport layer message or a network layer message.

Message 202 may comply with one or more protocols. For example, message 200 may be configured for communication on the transport layer or network layer, and may comply with one or more of the UDP, the lightweight UDP (UDP-Lite), the TCP the datagram congestion control protocol (DCCP), the stream control transport protocol (SCTP), the partially reliable SCTP (PR-SCTP), the datagram delivery protocol (DDP), distance vector multicast routing protocol (DVMRP), internet control message protocol (ICMP), internet group management protcocol (IGMP), internet prtococol security (IPsec), internet protocol (e.g., IPv4, IPv6; generally, IP), internetwork package exchange (IPX), protocol independent multicast dense mode (PIM-DM), protocol independent multicast sparse mode (PIM-SM), routing information protocol (RIP), routed split multi-link trunking (R-SMLT), shortest path bridging, a proprietary protocol, or the like. Message 202 may include a destination information 204 and a content 206. Destination information 204, either alone or in combination with other information, may indicate an area that contains devices 102 that should be recipients of content 206. Optionally, destination information 204 may include identifying other device information known by telecommunication system 100 regarding devices 102, such as device type, device model, device functionality, or the like.

Figure 4A:
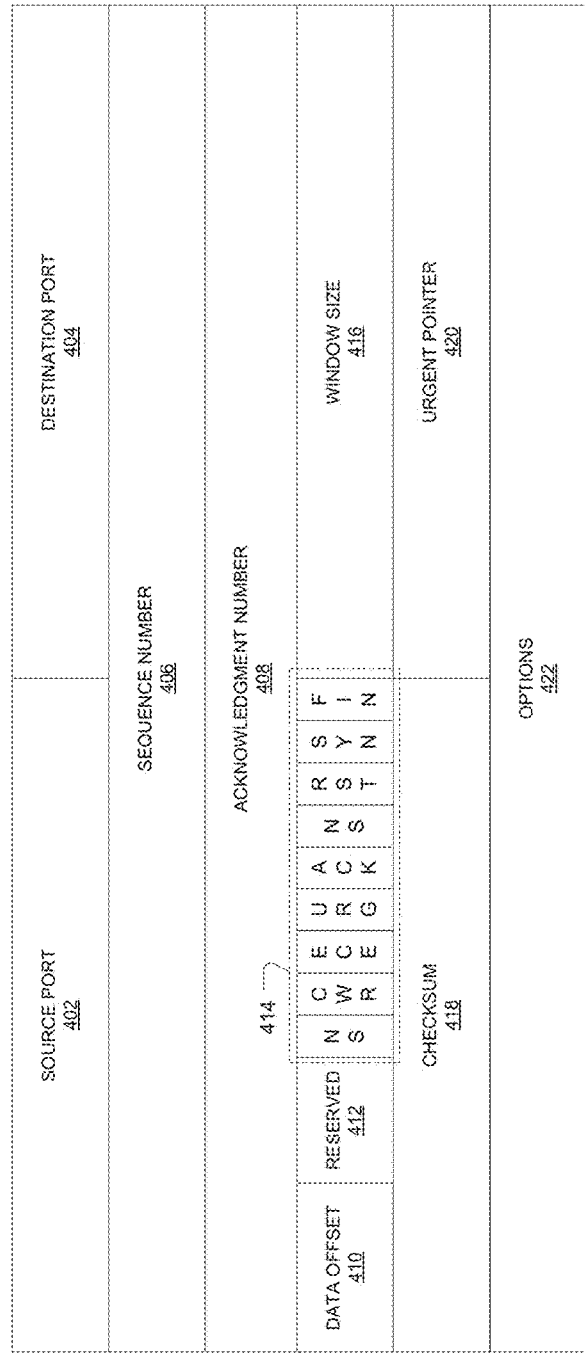
FIG. 4a illustrates an exemplary header that may be used to transmit destination information in accordance with an aspect of this disclosure.
Figure 4B:
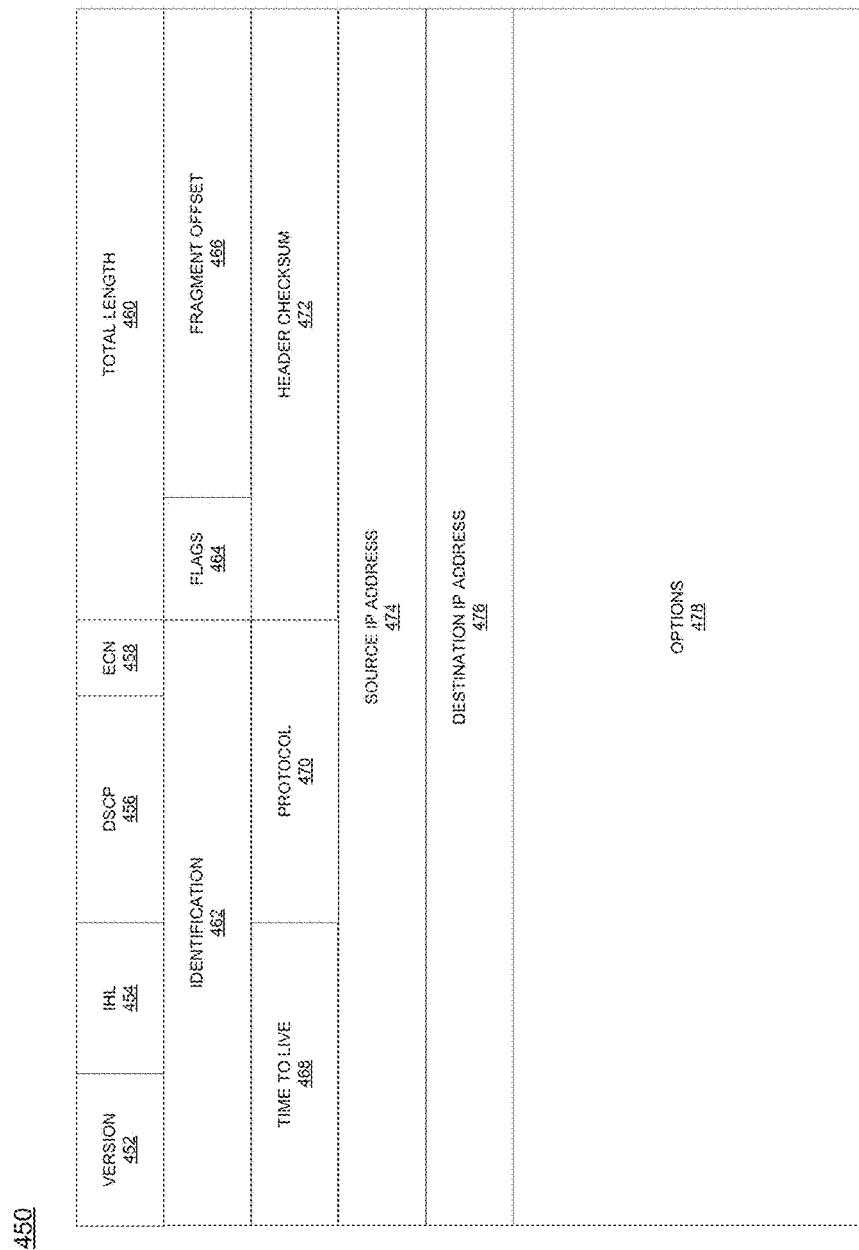
FIG. 4b illustrates an exemplary header that may be used to transmit destination information in accordance with an aspect of this disclosure.

Message 202 may include a header and content 206, and the header may include all or some of destination information 204. For example, message 202 may have a TCP header 400, as illustrated in FIG. 4a, or an IP header 450, as illustrated in FIG. 4b. Header 400 may include information or data required or permitted by the appropriate protocol. For example, TCP header 400 may include information or identification of a source port 402, a destination port 404, a sequence number 406, an acknowledgement number 406, a data offset 410, reserved bits 412, control bits 716, window size 716, checksum 418, urgent pointer 420, or options 422. In an aspect, TCP header 400 may include all or some of destination information 204. For example, destination port 404 may include all or some of destination information 204. As another example, IP header 470 may include information or identification of a version 452, an internet header length (IHL) 454, a differentiated services code point (DSCP) 456, an explicit congestion notification (ECN) 458, a total length 460, an identification 462, flags 464, a fragment offset 466, a time to live 468, a protocol 470, a header checksum 472, a source IP address 474, a destination IP address 476, or an option 478. In an aspect, IP header 450 may include all or some of destination information 204. For example, destination IP address 476 may include all or some of destination information 204.

Step 304 may include determining an area based on destination information 204. This may be performed by network controller 112. For example, while information in destination IP address 476 typically includes in IP address associated with the intended recipient 102b, destination IP address 476 may correspond with a specific geographic area, or a propagation mode (e.g., to transmit content to all devices within a specific geographic area or to transmit content to all devices within a vicinity of source device 102). For example, destination information 204 may include data, such as an area code, that corresponds with a specific area. As another example, reserved bits 412 of header 400 may indicate an area code. In another aspect, destination information 204 may indicate that content 206 is to be send to devices 102b that are closest to device 102a, or to devices 102b that are within a proximity to device 102a. Thus, step 304 may include determining a location of sender device 102a. Destination content 204 may not include unique identifiers of devices 102b.

Step 306 may include identifying a destination device 102b located within the area. For example, network controller 120 may use network location data 208 to identify devices 102b that are located within the area. Network location data 208 may include device identifiers associated with intended recipients 102b. This devices identifiers of intended recipients 102b may be unknown by source device 102a, or they may not be contained in message 202. Step 306 may include identifying a unique device identifier associated with each destination device 102b, such as an MSISDN, a UDID, an MIN, MSIN, IMEI, an IP address, or other information that may be used to route content 206 to the identified designated device 102b.

At step 308, method 300 may include routing content 204 to intended recipients 308. The routing may be based on the identifiers determined in step 306. As discussed above, destination information 204 may include priority information. Destination information may indicate a first area and a second area, where there is a higher priority that devices 102b located within the first area—as opposed to devices within the second area—receive content 206. Priority may be based different factors, such as device type, device functionality, the ability of a device 102b to relay content 204 directly to other devices 102b, or the like. Thus, routing content 204 may include transmitting content 204 to devices 102b having a first priority prior to transmitting content 204 to devices 102b having a second priority.

Figure 5:
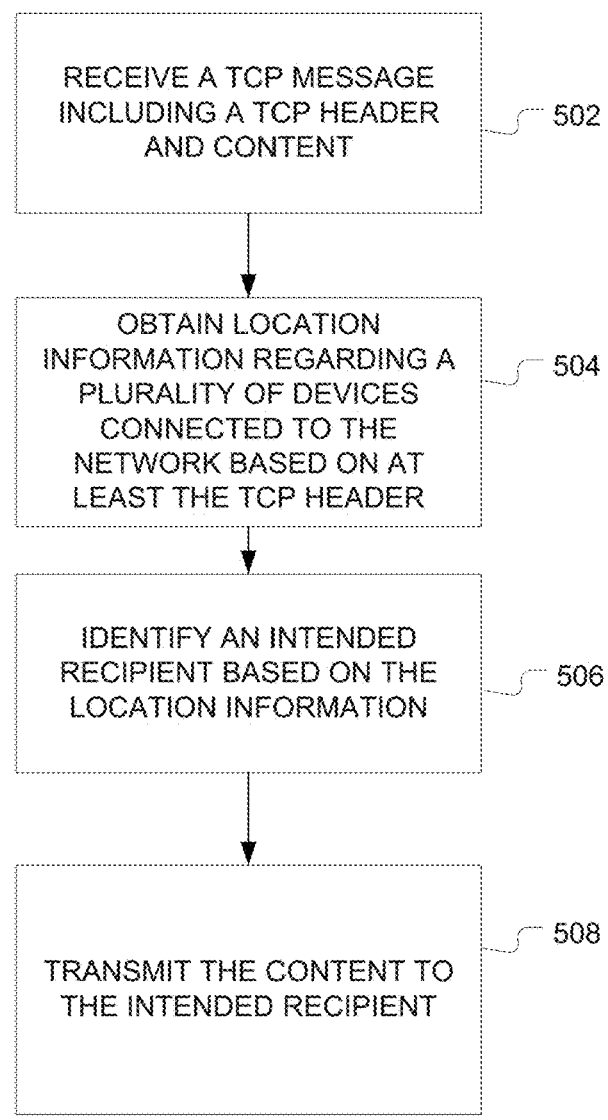
FIG. 5 is a flowchart of an exemplary method for location-based communications.

FIG. 5 is a flowchart of another exemplary method 500. Method 500 may be performed in whole or in part by network controller 120. At step 502, a network control system, such as network controller 120, may receive message 202. Message 202 may include content 202 and a header, such as TCP header 400, IP header 450, or the like. Message 202 may include destination information 204. Destination information 204 may be at least partially contained in the header. Destination information 204 may indicate a propagation mode for sending content 206 via network 118.

Propagation mode may be used, along with other information to identify the intended recipients of the device. For example, propagation mode may identify one or more characteristics that an intended recipient may possess. In an aspect, destination IP address 476 may include an indication of the propagation mode. For example, a dedicated IP address may be used to indicate a propagation mode. That is, inclusion of a first IP address in destination IP address 476 may indicate content 206 is to be transmitted to all devices 102b with a first set of characteristics, while inclusion of a second IP address in destination IP address 476 may indicate content 206 is to be transmitted to all devices 102 with a second set of characteristics.

Propagation mode may restrict or define the intended recipients of content 204 based on their network affiliations. For example, propagation mode may indicate that content 202 is to be sent to all devices 102 connected to network 118, or to a specific subnetwork, such as RAN 106 or core network 108. In an aspect, propagation mode may be even more specific, restricting the intended recipients to those devices 102 connected to a specific access point, gateway, or the like. Additionally or alternatively, propagation mode may restrict the intended recipients based on customer affiliation (e.g., devices of a specific customer).

Propagation mode may restrict or define the intended recipients based on the location of those recipients. Propagation mode may indicate that content 202 is to be sent to devices 102 that are located within a specific area. For example, the specific area may be a geographic area, such as a cell within network 118. TCP header may indicate the area. As another example, propagation mode may indicate the intended recipients are those located within a proximity of source device 102a, or it may indicate content 202 be sent to the closest device 102b, the four closest devices 102b, or the like.

In an aspect, a dedicated IP address may be used to indicate that identifying the recipients is a location-based inquiry. A second dedicated IP address may be used to indicate that identifying the recipients is a location-based inquiry based on the location of source device 102a. TCP header 400 may provide additional information for routing the message, such as a definition of the specific geographic area that contains devices 102b to which the content should be sent. For example, one or more reserved bits 412 may be used to indicate the geographic area. As another example, header 400 may indicate a "near me" flag that indicates that recipient devices 102b are those devices 102 physically proximate to device 102a. As another example, TCP header 400 may include data defining the proximity, e.g., by providing a radius. For example, this information may be contained in reserved bits 414.

In addition or alternative to location, propagation mode may include additional restrictions on what qualifies as a recipient device 102b, such as device type, device functionality, or the like. For example, a propagation mode may indicate transmitting content 202 to all home automation equipment connected to network 118, all AT&T Digital Life® branded equipment connected to network 118, all thermostats connected to network 118, or all devices capable of measuring heart rate that are connected to network 118.

At step 504, method 500 may include obtaining location data regarding a plurality of devices 102 connected to network 118 based on at least TCP header 400. The location data 208 may originate with network 118, or devices that control operation of network 118. For example, step 504 may identify devices 102 located within a geographic area indicated by TCP header 400. Additionally or alternatively, this may include obtaining location data from one or more location registers in network 118. The location data may include device identifiers of devices 102.

At step 506, method 500 may include identifying an intended recipient (e.g. device 102b) based on at least location data 208. If the propagation mode indicates content 206 is to be transmitted to devices 102 within an area, step 506 may include comparing location data of devices 102 to the area to identify the subset of devices 102 within the area. For example, if the propagation mode indicates the intended recipients are based on a proximity to source device 102a, then step 506 may include determining the location of source device 102a. It may also include defining an area based on a radius associated with the proximity and the location of source device 102a (e.g., based on reserved bits 414 of TCP header 400). Then, location data 208 may be used to identify the subset of devices 102 within the area. Step 506 may optionally be based on other factors, such as other device characteristics, like those indicated by the propagation mode.

Method 500 may include determining device identifiers of the intended recipient devices 102b. For example, these identifiers may be used to transmit content 206 to devices 102b. Device identifiers may be derived from location data 208. In an aspect, TCP header 400 may not indicate the device identifiers of recipient devices 102b. In an aspect, TCP header 400 may not indicate a route that leads to a particular recipient device 102b. For example, TCP header 400 may generally indicate the type of devices that content 206 should be sent to, and device controller 118 may perform the necessary steps to identify those devices and ultimately transmit content 206. At step 508, method 500 may include transmitting content 206 to the intended recipient 102b. Step 508 may use the device identifiers associated with devices 102b.

Figure 6:
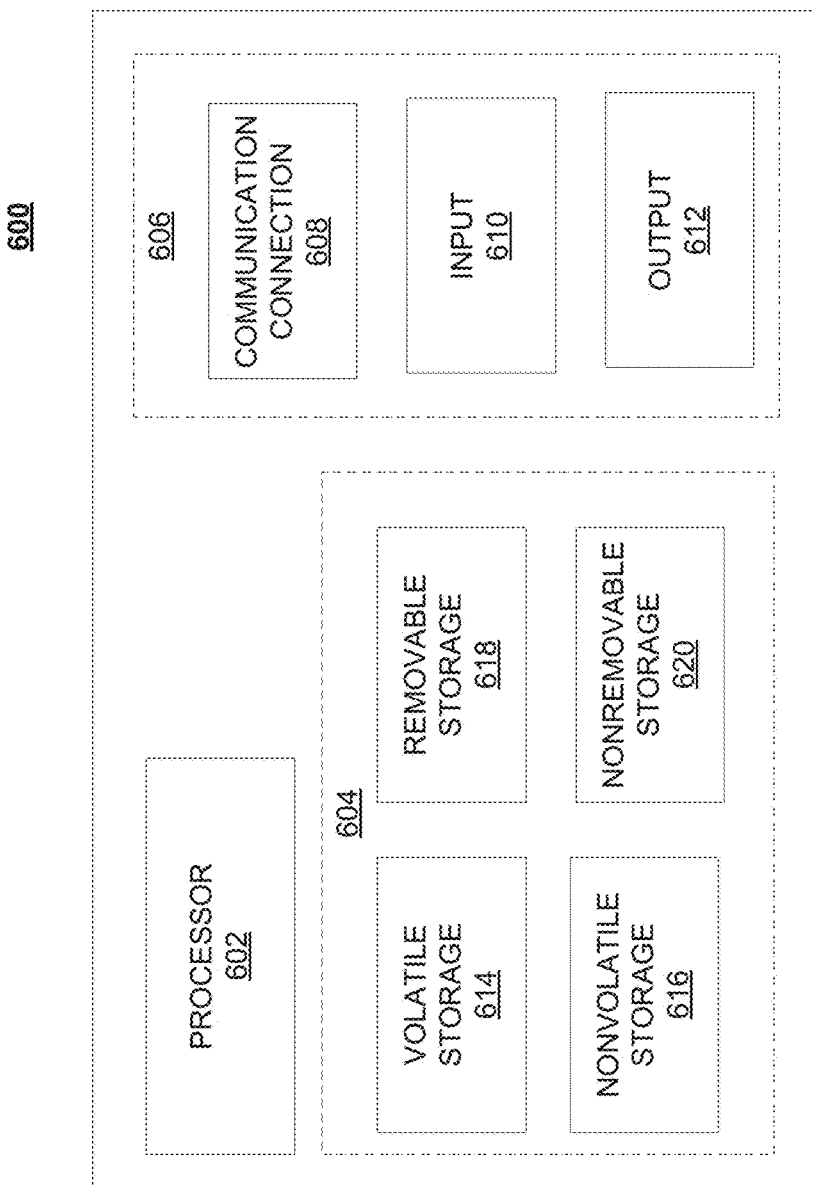
FIG. 6 is a schematic of an exemplary network device.

FIG. 6 is a block diagram of a network device 600 that may be connected to or comprise a component of telecommunication system 100. For example, network controller 120 may comprise all or a portion of network device 600. Network device 600 may comprise hardware or a combination of hardware and software. The functionality to facilitate telecommunications via a telecommunications network may reside in one or a combination of network devices 600. Network device 600 depicted in FIG. 6 may represent or perform functionality of an appropriate network device 600, or combination of network devices 600, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 6 is exemplary and not intended to imply a limitation to a specific implementation or configuration. Thus, network device 600 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 600 may comprise a processor 602 and a memory 604 coupled to processor 602. Memory 604 may contain executable instructions that, when executed by processor 602, cause processor 602 to effectuate operations associated with mapping wireless signal strength. As evident from the description herein, network device 600 is not to be construed as software per se.

In addition to processor 602 and memory 604, network device 600 may include an input/output system 606. Processor 602, memory 604, and input/output system 606 may be coupled together (coupling not shown in FIG. 6) to allow communications therebetween. Each portion of network device 600 may comprise circuitry for performing functions associated with each respective portion. Thus, each portion may comprise hardware, or a combination of hardware and software. Accordingly, each portion of network device 300 is not to be construed as software per se. Input/output system 606 may be capable of receiving or providing information from or to a communications device or other network entities configured for telecommunications. For example input/output system 606 may include a wireless communications (e.g., 3G/4G/GPS) card. Input/output system 606 may be capable of receiving or sending video information, audio information, control information, image information, data, or any combination thereof. Input/output system 606 may be capable of transferring information with network device 600. In various configurations, input/output system 606 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 606 may comprise a Wi-Fi finder, a two-way GPS chipset or equivalent, or the like, or a combination thereof.

Input/output system 606 of network device 600 also may contain a communication connection 608 that allows network device 600 to communicate with other devices, network entities, or the like. Communication connection 608 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 606 also may include an input device 610 such as keyboard, mouse, pen, voice input device, or touch input device. Input/output system 606 may also include an output device 612, such as a display, speakers, or a printer.

Processor 602 may be capable of performing functions associated with telecommunications, such as functions for processing broadcast messages, as described herein. For example, processor 602 may be capable of, in conjunction with any other portion of network device 600, determining a type of broadcast message and acting according to the broadcast message type or content, as described herein.

Memory 604 of network device 600 may comprise a storage medium having a concrete, tangible, physical structure. As is known, a signal does not have a concrete, tangible, physical structure. Memory 604, as well as any computer-readable storage medium described herein, is not to be construed as a signal. Memory 604, as well as any computer-readable storage medium described herein, is not to be construed as a transient signal. Memory 604, as well as any computer-readable storage medium described herein, is not to be construed as a propagating signal. Memory 604, as well as any computer-readable storage medium described herein, is to be construed as an article of manufacture.

Memory 604 may store any information utilized in conjunction with telecommunications. Depending upon the exact configuration or type of processor, memory 604 may include a volatile storage 614 (such as some types of RAM), a nonvolatile storage 316 (such as ROM, flash memory), or a combination thereof. Memory 604 may include additional storage (e.g., a removable storage 618 or a nonremovable storage 620) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 600. Memory 604 may comprise executable instructions that, when executed by processor 602, cause processor 602 to effectuate operations to map signal strengths in an area of interest.

Figure 7:
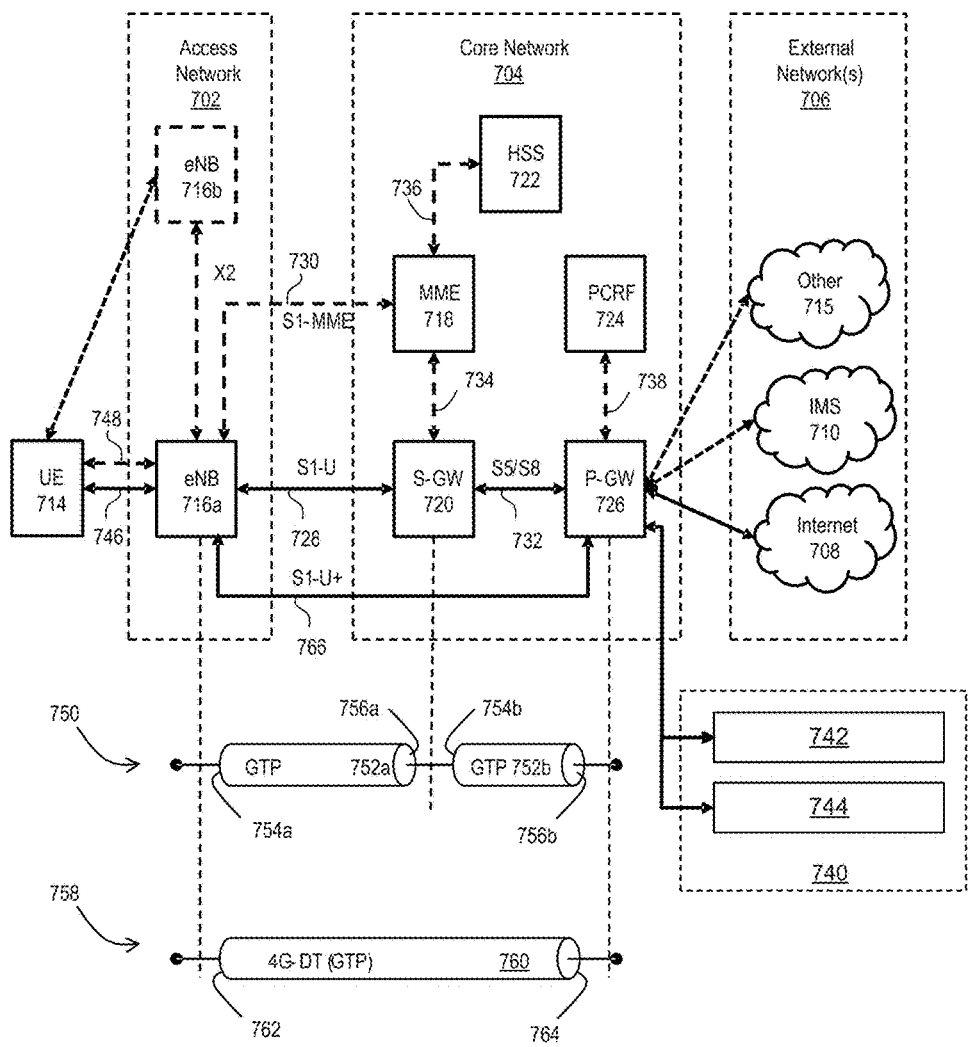
FIG. 7 is an exemplary network architecture.

FIG. 7 illustrates a functional block diagram depicting one example of an LTE-EPS network architecture 700 related to the current disclosure. In particular, the network architecture 700 disclosed herein is referred to as a modified LTE-EPS architecture 700 to distinguish it from a traditional LTE-EPS architecture.

An example modified LTE-EPS architecture 700 is based at least in part on standards developed by the 3rd Generation Partnership Project (3GPP), with information available at www.3gpp.org. In one embodiment, the LTE-EPS network architecture 700 includes an access network 702, a core network 704, e.g., an EPC or Common BackBone (CBB) and one or more external networks 706, sometimes referred to as PDN or peer entities. Different external networks 706 can be distinguished from each other by a respective network identifier, e.g., a label according to DNS naming conventions describing an access point to the PDN. Such labels can be referred to as Access Point Names (APN). External networks 706 can include one or more trusted and non-trusted external networks such as an internet protocol (IP) network 708, an IP multimedia subsystem (IMS) network 710, and other networks 712, such as a service network, a corporate network, or the like. Network 104 may include one or more access networks 702, core networks 704, or an external networks 706.

Access network 702 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 702 can include one or more communication devices, commonly referred to as UE 714, and one or more wireless access nodes, or base stations 716*a*, 716*b*. During network operations, at least one base station 716 communicates directly with UE 714. Base station 716 can be an evolved Node B (e-NodeB), with which UE 714 communicates over the air and wirelessly. UEs 714 can include, without limitation, wireless devices, e.g., satellite communication systems, portable digital assistants (PDAs), laptop computers, tablet devices and other mobile devices (e.g., cellular telephones, smart appliances, and so on). UEs 714 can connect to eNBs 716 when UE 714 is within range according to a corresponding wireless communication technology.

UE 714 generally runs one or more applications that engage in a transfer of packets between UE 714 and one or more external networks 706. Such packet transfers can include one of downlink packet transfers from external network 706 to UE 714, uplink packet transfers from UE 714 to external network 706 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 704, e.g., according to parameters, such as the QoS.

Core network 704 uses a concept of bearers, e.g., EPS bearers, to route packets, e.g., IP traffic, between a particular gateway in core network 704 and UE 714. A bearer refers generally to an IP packet flow with a defined QoS between the particular gateway and UE 714. Access network 702, e.g., E UTRAN, and core network 704 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 704 includes various network entities, such as MME 718, SGW 720, Home Subscriber Server (HSS) 722, Policy and Charging Rules Function (PCRF) 724 and PGW 726. In one embodiment, MME 718 comprises a control node performing a control signaling between various equipment and devices in access network 702 and core network 704. The protocols running between UE 714 and core network 704 are generally known as Non-Access Stratum (NAS) protocols.

For illustration purposes only, the terms MME 718, SGW 720, HSS 722 and PGW 726, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 720 routes and forwards all user data packets. SGW 720 also acts as a mobility anchor for user plane operation during handovers between base stations, e.g., during a handover from first eNB 716*a* to second eNB 716*b* as may be the result of UE 714 moving from one area of coverage, e.g., cell, to another. SGW 720 can also terminate a downlink data path, e.g., from external network 706 to UE 714 in an idle state, and trigger a paging operation when downlink data arrives for UE 714. SGW 720 can also be configured to manage and store a context for UE 714, e.g., including one or more of parameters of the IP bearer service and network internal routing information. In addition, SGW 720 can perform administrative functions, e.g., in a visited network, such as collecting information for charging (e.g., the volume of data sent to or received from the user), or replicate user traffic, e.g., to support a lawful interception. SGW 720 also serves as the mobility anchor for interworking with other 3GPP technologies such as universal mobile telecommunication system (UMTS).

At any given time, UE 714 is generally in one of three different states: detached, idle, or active. The detached state is typically a transitory state in which UE 714 is powered on but is engaged in a process of searching and registering with network 702. In the active state, UE 714 is registered with access network 702 and has established a wireless connection, e.g., radio resource control (RRC) connection, with eNB 716. Whether UE 714 is in an active state can depend on the state of a packet data session, and whether there is an active packet data session. In the idle state, UE 714 is generally in a power conservation state in which UE 714 typically does not communicate packets. When UE 714 is idle, SGW 720 can terminate a downlink data path, e.g., from one peer entity 406, and triggers paging of UE 714 when data arrives for UE 714. If UE 714 responds to the page, SGW 720 can forward the IP packet to eNB 716*a*.

HSS 722 can manage subscription-related information for a user of UE 714. For example, tHSS 722 can store information such as authorization of the user, security requirements for the user, quality of service (QoS) requirements for the user, etc. HSS 722 can also hold information about external networks 706 to which the user can connect, e.g., in the form of an APN of external networks 706. For example, MME 718 can communicate with HSS 722 to determine if UE 714 is authorized to establish a call, e.g., a voice over IP (VoIP) call before the call is established.

PCRF 724 can perform QoS management functions and policy control. PCRF 724 is responsible for policy control decision-making, as well as for controlling the flow-based charging functionalities in a policy control enforcement function (PCEF), which resides in PGW 726. PCRF 724 provides the QoS authorization, e.g., QoS class identifier and bit rates that decide how a certain data flow will be treated in the PCEF and ensures that this is in accordance with the user's subscription profile.

PGW 726 can provide connectivity between the UE 714 and one or more of the external networks 706. In illustrative network architecture 700, PGW 726 can be responsible for IP address allocation for UE 714, as well as one or more of QoS enforcement and flow-based charging, e.g., according to rules from the PCRF 724. PGW 726 is also typically responsible for filtering downlink user IP packets into the different QoS-based bearers. In at least some embodiments, such filtering can be performed based on traffic flow templates. PGW 726 can also perform QoS enforcement, e.g., for guaranteed bit rate bearers. PGW 726 also serves as a mobility anchor for interworking with non-3GPP technologies such as CDMA2000.

Within access network 702 and core network 704 there may be various bearer paths/interfaces, e.g., represented by solid lines 728 and 730. Some of the bearer paths can be referred to by a specific label. For example, solid line 728 can be considered an S1-U bearer and solid line 732 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 704 can include various signaling bearer paths/interfaces, e.g., control plane paths/interfaces represented by dashed lines 730, 734, 736, and 738. Some of the signaling bearer paths may be referred to by a specific label. For example, dashed line 730 can be considered as an S1-MME signaling bearer, dashed line 734 can be considered as an S11 signaling bearer and dashed line 736 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 766. In the illustrative example, the S1-U+ user plane interface extends between the eNB 716a and PGW 726. Notably, S1-U+ path/interface does not include SGW 720, a node that is otherwise instrumental in configuring and/or managing packet forwarding between eNB 716a and one or more external networks 706 by way of PGW 726. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 720, 726 due to excessive handover events.

In some embodiments, PGW 726 is coupled to storage device 740, shown in phantom. Storage device 740 can be integral to one of the network nodes, such as PGW 726, for example, in the form of internal memory and/or disk drive. It is understood that storage device 740 can include registers suitable for storing address values. Alternatively or in addition, storage device 740 can be separate from PGW 726, for example, as an external hard drive, a flash drive, and/or network storage.

Storage device 740 selectively stores one or more values relevant to the forwarding of packet data. For example, storage device 740 can store identities and/or addresses of network entities, such as any of network nodes 718, 720, 722, 724, and 726, eNBs 716 and/or UE 714. In the illustrative example, storage device 740 includes a first storage location 742 and a second storage location 744. First storage location 442 can be dedicated to storing a Currently Used Downlink address value 742. Likewise, second storage location 744 can be dedicated to storing a Default Downlink Forwarding address value 444. PGW 726 can read and/or write values into either of storage locations 742, 744, for example, managing Currently Used Downlink Forwarding address value 742 and Default Downlink Forwarding address value 744 as disclosed herein.

In some embodiments, the Default Downlink Forwarding address for each EPS bearer is the SGW S5-U address for each EPS Bearer. The Currently Used Downlink Forwarding address" for each EPS bearer in PGW 726 can be set every time when PGW 726 receives an uplink packet, e.g., a GTP-U uplink packet, with a new source address for a corresponding EPS bearer. When UE 714 is in an idle state, the "Current Used Downlink Forwarding address" field for each EPS bearer of UE 714 can be set to a "null" or other suitable value.

In some embodiments, the Default Downlink Forwarding address is only updated when PGW 726 receives a new SGW S5-U address in a predetermined message or messages. For example, the Default Downlink Forwarding address is only updated when PGW 726 receives one of a Create Session Request, Modify Bearer Request and Create Bearer Response messages from SGW 720.

As values 742, 744 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 702 and core network 704 are illustrated in a simplified block diagram in FIG. 7. In other words, either or both of access network 702 and the core network 704 can include additional network elements that are not shown, such as various routers, switches and controllers. In addition, although FIG. 7 illustrates only a single one of each of the various network elements, it should be noted that access network 702 and core network 704 can include any number of the various network elements. For example, core network 704 can include a pool (i.e., more than one) of MMEs 718, SGWs 720 or PGWs 726.

In the illustrative example, data traversing a network path between UE 714, eNB 716a, SGW 720, PGW 726 and external network 706 may be considered to constitute data transferred according to an end-to-end IP service. However, for the present disclosure, to properly perform establishment management in LTE-EPS network architecture 700, the core network, data bearer portion of the end-to-end IP service is analyzed.

An establishment may be defined herein as a connection set up request between any two elements within LTE-EPS network architecture 700. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 746) between UE 714 and eNB 716a, a second portion (e.g., an S1 data bearer 728) between eNB 716a and SGW 720, and a third portion (e.g., an S5/S8 bearer 732) between SGW 720 and PGW 726. Various signaling bearer portions are also illustrated in FIG. 7. For example, a first signaling portion (e.g., a signaling radio bearer 748) between UE 714 and eNB 716a, and a second signaling portion (e.g., S1 signaling bearer 730) between eNB 716a and MME 718.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 700, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 750 includes a first tunnel 752a between two tunnel endpoints 754a and 756a, and a second tunnel 752b between two tunnel endpoints 754b and 756b. In the illustrative example, first tunnel 752a is established between eNB 716a and SGW 720. Accordingly, first tunnel 752a includes a first tunnel endpoint 754a corresponding to an S1-U address of eNB 716a (referred to herein as the eNB S1-U address), and second tunnel endpoint 756a corresponding to an S1-U address of SGW 720

(referred to herein as the SGW S1-U address). Likewise, second tunnel 752b includes first tunnel endpoint 754b corresponding to an S5-U address of SGW 720 (referred to herein as the SGW S5-U address), and second tunnel endpoint 756b corresponding to an S5-U address of PGW 726 (referred to herein as the PGW S5-U address).

In at least some embodiments, first tunnel solution 750 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 758 includes a single or direct tunnel 760 between tunnel endpoints 762 and 764. In the illustrative example, direct tunnel 760 is established between eNB 716a and PGW 726, without subjecting packet transfers to processing related to SGW 720. Accordingly, direct tunnel 760 includes first tunnel endpoint 762 corresponding to the eNB S1-U address, and second tunnel endpoint 764 corresponding to the PGW S5-U address. Packet data received at either end can be encapsulated into a payload and directed to the corresponding address of the other end of the tunnel. Such direct tunneling avoids processing, e.g., by SGW 720 that would otherwise relay packets between the same two endpoints, e.g., according to a protocol, such as the GTP-U protocol.

In some scenarios, direct tunneling solution 758 can forward user plane data packets between eNB 716a and PGW 726, by way of SGW 720. That is, SGW 720 can serve a relay function, by relaying packets between two tunnel endpoints 716a, 726. In other scenarios, direct tunneling solution 758 can forward user data packets between eNB 716a and PGW 726, by way of the S1 U+ interface, thereby bypassing SGW 720.

Generally, UE 714 can have one or more bearers at any one time. The number and types of bearers can depend on applications, default requirements, and so on. It is understood that the techniques disclosed herein, including the configuration, management and use of various tunnel solutions 750, 758, can be applied to the bearers on an individual bases. That is, if user data packets of one bearer, say a bearer associated with a VoIP service of UE 714, then the forwarding of all packets of that bearer are handled in a similar manner. Continuing with this example, the same UE 714 can have another bearer associated with it through the same eNB 716a. This other bearer, for example, can be associated with a relatively low rate data session forwarding user data packets through core network 704 simultaneously with the first bearer. Likewise, the user data packets of the other bearer are also handled in a similar manner, without necessarily following a forwarding path or solution of the first bearer. Thus, one of the bearers may be forwarded through direct tunnel 758; whereas, another one of the bearers may be forwarded through a two-tunnel solution 750.

Figure 8:
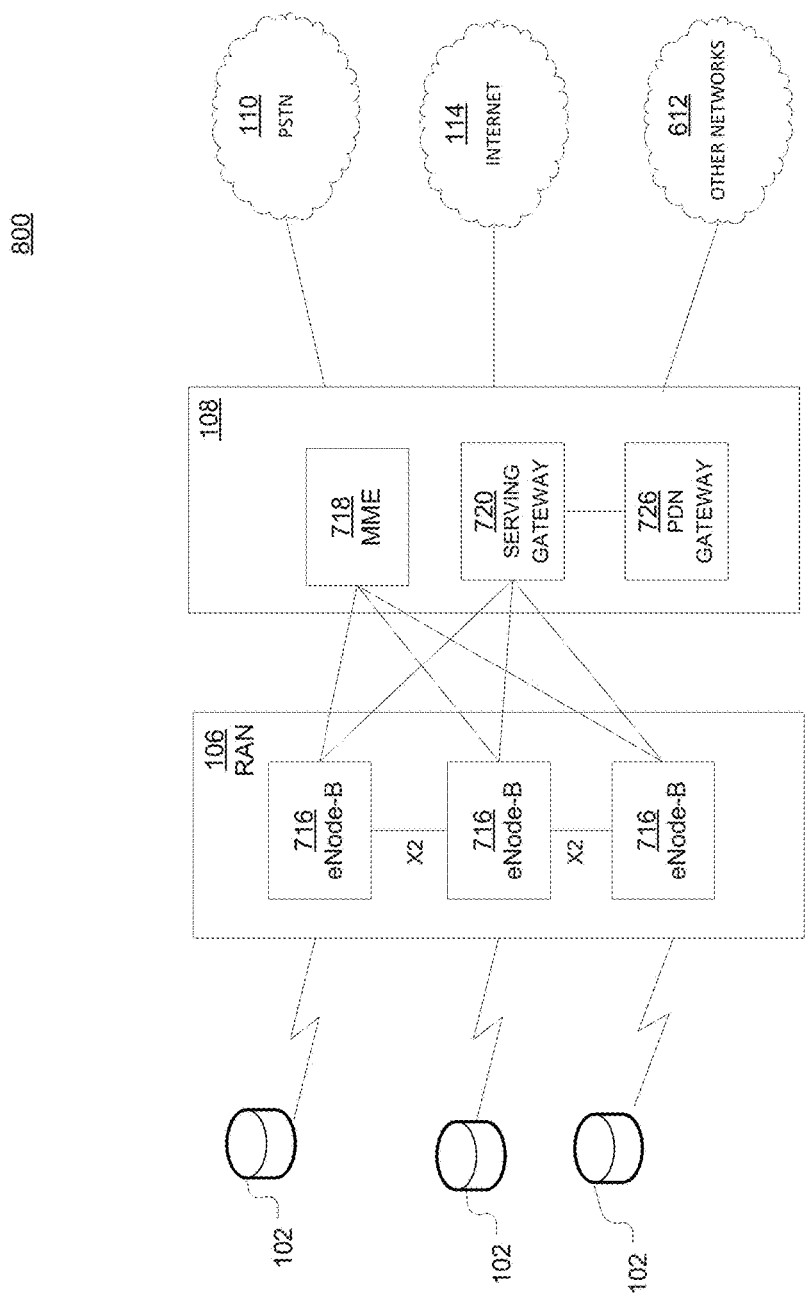
FIG. 8 depicts an exemplary communication system that provides wireless telecommunication services over wireless communication networks.

FIG. 8 is an example system 800 including RAN 106 and core network 108. As noted above, RAN 106 may employ an E-UTRA radio technology to communicate with Devices 102 over air interface 116. RAN 106 may also be in communication with core network 108.

RAN 106 may include any number of eNode-Bs 716 while remaining consistent with the disclosed technology. One or more eNode-Bs 716 may include one or more transceivers for communicating with the devices 102 over air interface 116. Optionally, eNode-Bs 716 may implement MIMO technology. Thus, one of eNode-Bs 716, for example, may use multiple antennas to transmit wireless signals to, or receive wireless signals from, one of Devices 102.

Each of eNode-Bs 716 may be associated with a particular cell (not shown) and may be configured to handle radio resource management decisions, handover decisions, scheduling of users in the uplink or downlink, or the like. As shown in FIG. 7 eNode-Bs 716 may communicate with one another over an X2 interface.

Core network 108 shown in FIG. 7 may include a mobility management gateway or entity (MME) 718, a serving gateway 706, or a packet data network (PDN) gateway 726. While each of the foregoing elements are depicted as part of core network 108, it will be appreciated that any one of these elements may be owned or operated by an entity other than the core network operator.

MME 718 may be connected to each of eNode-Bs 716 in RAN 106 via an S1 interface and may serve as a control node. For example, MME 718 may be responsible for authenticating users of devices 102, bearer activation or deactivation, selecting a particular serving gateway during an initial attach of devices 102, or the like. MME 718 may also provide a control plane function for switching between RAN 106 and other RANs (not shown) that employ other radio technologies, such as GSM or WCDMA.

Serving gateway 706 may be connected to each of eNode-Bs 716 in RAN 106 via the S1 interface. Serving gateway 720 may generally route or forward user data packets to or from the devices 102. Serving gateway 720 may also perform other functions, such as anchoring user planes during inter-eNode B handovers, triggering paging when downlink data is available for devices 102, managing or storing contexts of devices 102, or the like.

Serving gateway 720 may also be connected to PDN gateway 726, which may provide devices 102 with access to packet-switched networks, such as Internet 112, to facilitate communications between devices 102 and IP-enabled devices.

Core network 108 may facilitate communications with other networks. For example, core network 108 may provide devices 102 with access to circuit-switched networks, such as PSTN 110, to facilitate communications between devices 102 and traditional land-line communications devices. In addition, core network 108 may provide the devices 102 with access to other networks 114, which may include other wired or wireless networks that are owned or operated by other service providers.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
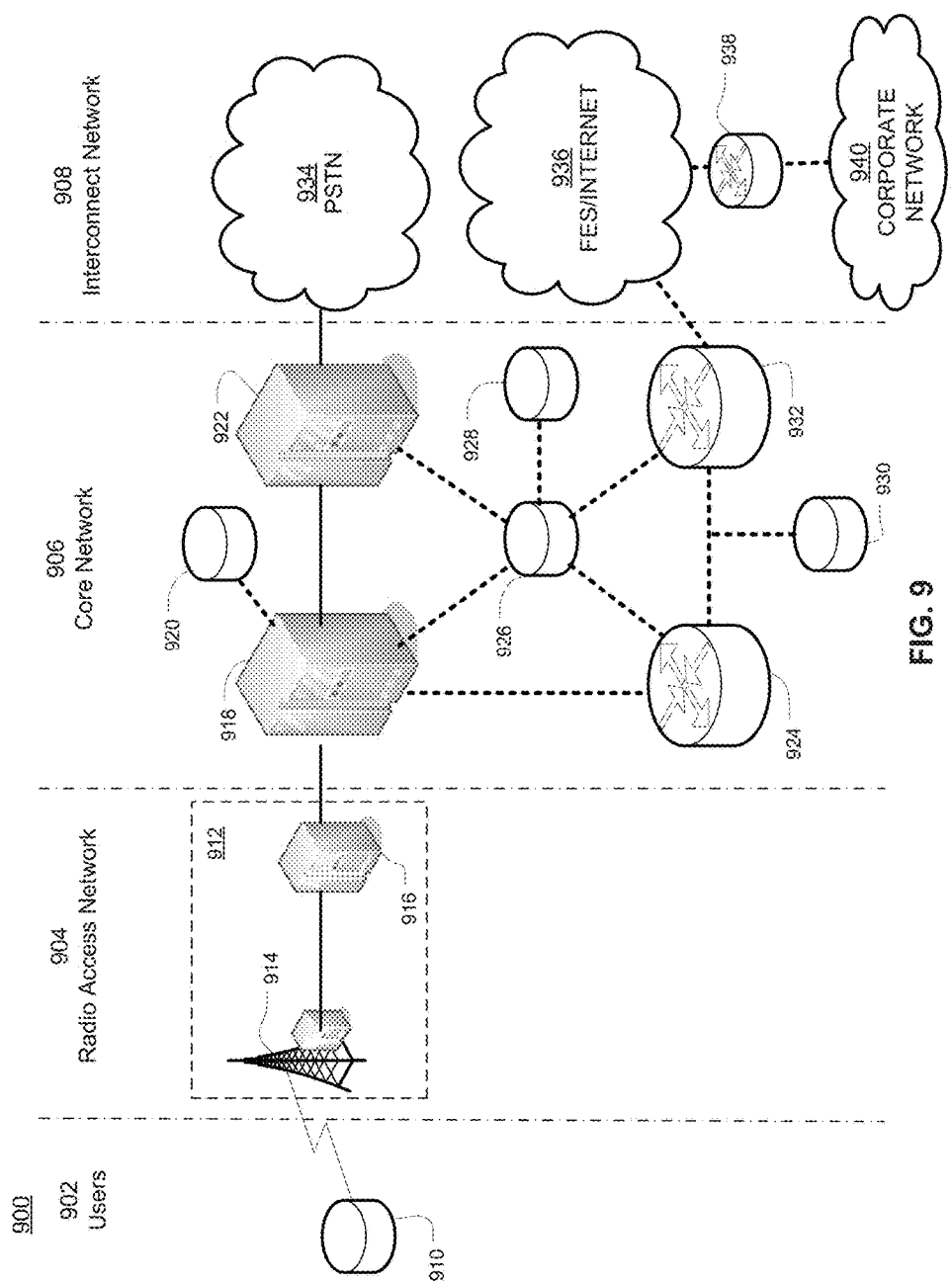
FIG. 9 illustrates an exemplary architecture of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
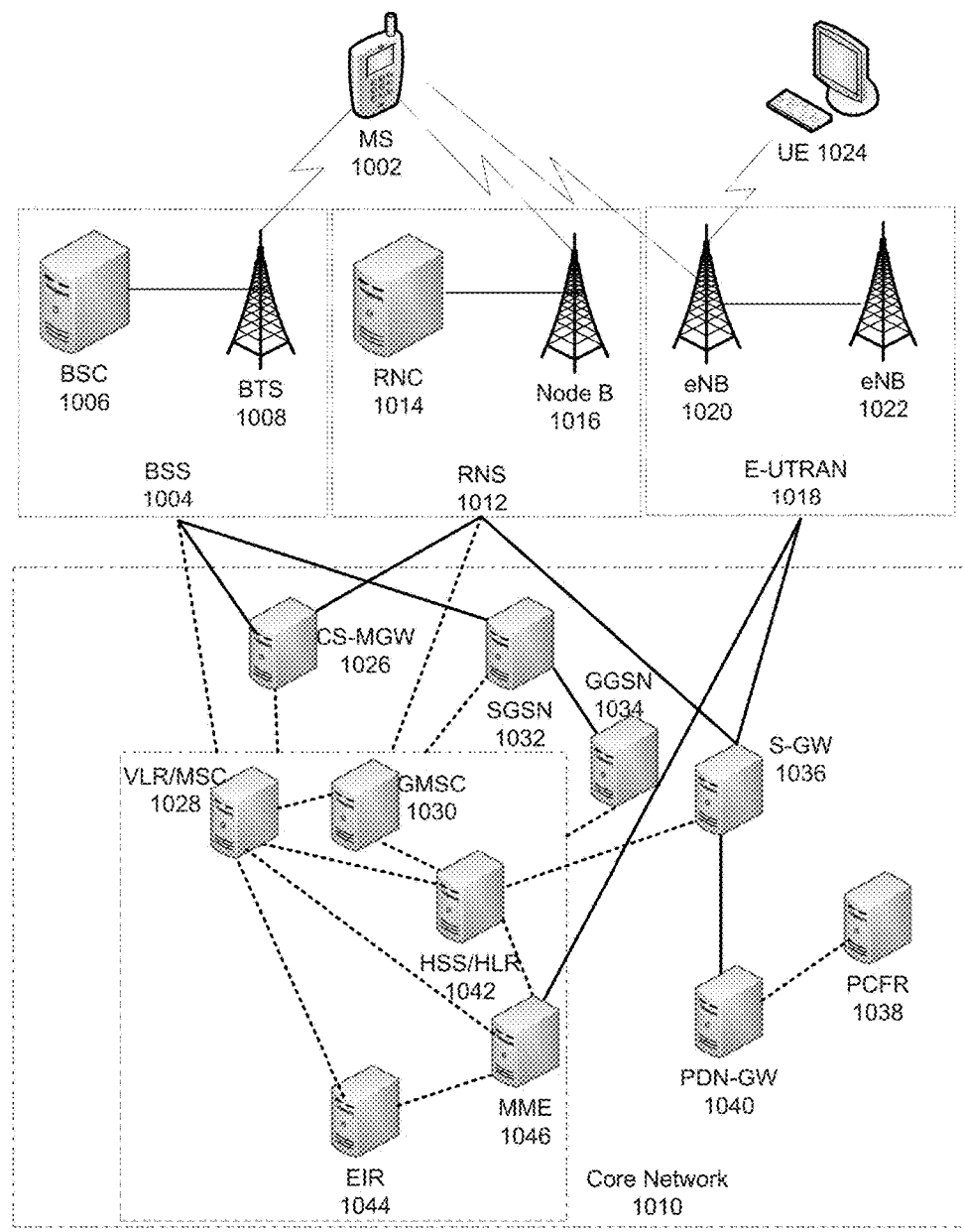
FIG. 10 is a block diagram of an exemplary public land mobile network (PLMN).

FIG. 10 illustrates a PLMN block diagram view of an example architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 300. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location data such as, but not limited to, GGSN address for each GGSN 1034 where an active PDP exists. GGSN 1034 may implement a location register function to store subscriber data it receives from SGSN 1032 such as subscription or location data.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location data. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location data to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed:

1. A method comprising:
   receiving, at a network control system, a message including content and a header, wherein a destination internet protocol (IP) address of the header identifies a propagation mode for sending the content via a network;
   based on at least the propagation mode, obtaining location data regarding a plurality of devices connected to the network, the location data indicating the content is to be sent to a closest device of the plurality of devices;
   based on at least the location data, identifying an intended recipient from the plurality of devices, wherein the intended recipient comprises the closest device; and
   transmitting the content to the intended recipient.

2. The method of claim 1, wherein the propagation mode is based on a reserved bit of the header.

3. The method of claim 1,
   wherein identifying the intended recipient comprises determining a device identifier associated with the intended recipient, and
   wherein transmitting the content to the intended recipient comprises using the device identifier to transmit the content.

4. The method of claim 3, wherein the message excludes the device identifier.

5. The method of claim 1, wherein the propagation mode indicates the content is to be sent to a subset of the plurality of devices that are located within a proximity of a source device, the subset comprising the closest device,
   wherein identifying the intended recipient further comprises:
      identifying a source device location; and
      identifying the subset based on at least the source device location and the proximity, and
   wherein the source device sent the message and the subset comprises the intended recipient.

6. The method of claim 5, wherein the header comprises a reserved bit, wherein the header indicates a value associated with the proximity, and obtaining the location data is further based on the reserved bit.

7. The method of claim 1, wherein the propagation mode indicates the content is to be sent to a subset of the plurality of devices that are located in an area,
   wherein identifying the intended recipient further comprises:
      determining the area based on at least the header; and
      identifying the subset based on at least the area, and
   wherein the subset comprises the intended recipient.

8. The method of claim 1, wherein the plurality of devices are wireless devices.

9. A network controller comprising:
   an input/output system for communicatively coupling the network controller to a network;
   a processor communicatively coupled to the input/output system; and
   memory storing instructions that cause the processor to effectuate operations, the operations comprising:
      receiving, at the input/output system, a message including content and a header, wherein a destination internet protocol (IP) address of the header identifies a propagation mode for sending the content via the network;
      based on at least the propagation mode, obtaining location data regarding a plurality of devices connected to the network, the location data indicating the content is to be sent to a closest device of the plurality of devices;
      based on at least the location data, identifying an intended recipient from the plurality of devices, wherein the intended recipient comprises the closest device; and
      transmitting the content to the intended recipient.

10. The network controller of claim 9, wherein the propagation mode is further based on a reserved bit of the header.

11. The network controller of claim 9,
    wherein identifying the intended recipient comprises determining a device identifier associated with the intended recipient, and
    wherein transmitting the content to the intended recipient comprises using the device identifier to transmit the content.

12. The network controller of claim 11, wherein the message excludes the device identifier.

13. The network controller of claim 9, wherein the propagation mode indicates the content is to be sent to a subset of the plurality of devices that are located within a proximity of a source device, the subset comprising the closest device,
    wherein identifying the intended recipient further comprises:
       identifying a source device location; and
       identifying the subset based on at least the source device location and the proximity, and
    wherein the source device sent the message and the subset comprises the intended recipient.

14. The network controller of claim 13, wherein a reserved bit of the header indicates a value associated with the proximity, and obtaining the location data is further based on the reserved bit.

15. The network controller of claim 9, wherein the propagation mode indicates the content is to be sent to a subset of the plurality of devices that are located in an area,
wherein identifying the intended recipient further comprises:
determining the area based on at least the header; and
identifying the subset based on at least the area, and
wherein the subset comprises the intended recipient.

16. A method comprising: receiving a message from a source device, the message including content and an internet protocol (IP) address indicative of a propagation mode;
determining a cell within a network based on at least the IP address;
according to the propagation mode, identifying a closest device from a plurality of devices located within the cell based on at least network data; and
according to the propagation mode, routing the content to a destination IP address of the closest device, wherein the destination IP address differs from the IP address.

17. The method of claim 16, wherein determining the cell comprises:
identifying a location of the source device; and
determining an area based on a proximity indicated by the IP address and the location of the source device.

18. The method of claim 16, wherein the message comprises priority information indicating a first priority associated with the cell is greater than a second priority associated with a second area that differs from the cell, the method further comprising:
identifying a second closest device located within the second area based on at least the network data; and
routing the content to the second closest device after routing the content to the first closest device, based on at least the priority information.

* * * * *